(No Model.)

H. BARTLEY.
CONDUIT FOR THE CONVEYANCE OF GAS UNDER PRESSURE.

No. 317,283. Patented May 5, 1885.

Witnesses
W. C. Chaffee
Daniel Scott

Inventor
Harvey Bartley
By Connolly Bros & McTighe
Attorneys

UNITED STATES PATENT OFFICE.

HARVEY BARTLEY, OF PITTSBURG, PENNSYLVANIA, ASSIGNOR OF ONE THIRD TO J. F. STEEL, OF SAME PLACE.

CONDUIT FOR THE CONVEYANCE OF GAS UNDER PRESSURE.

SPECIFICATION forming part of Letters Patent No. 317,283, dated May 5, 1885.

Application filed March 24, 1885. (No model.)

*To all whom it may concern:*

Be it known that I, HARVEY BARTLEY, of Pittsburg, in the county of Allegheny and State of Pennsylvania, have invented certain new and useful Improvements in Conduits for the Conveyance of Gas under Pressure; and I do hereby declare that the following is a full, clear, and exact description of the invention, which will enable others skilled in the art to which it appertains to make and use the same, reference being had to the accompanying drawings, which form a part of this specification.

This invention relates to improvements in a system of conduits for the conveyance and transportation of gas under pressure; and the objects of my invention are, first, to provide for the safe conveyance and transportation of gas under pressure; second, to conduct into the open air any gas which may leak from the joints on the pipes or from the pipes themselves; third, to preserve the joints and pipes. I attain these objects by means of the mechanism illustrated in the accompanying drawings, in which—

Figure 1:
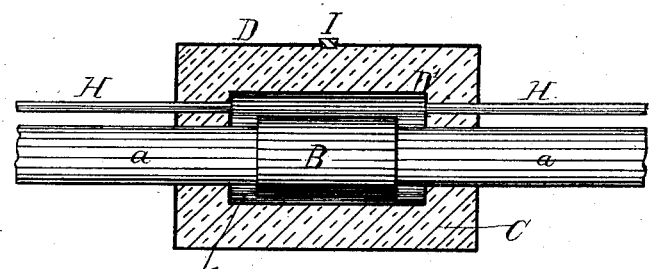
Figure 2:
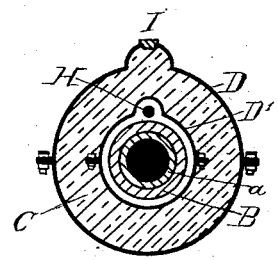
Figure 3:
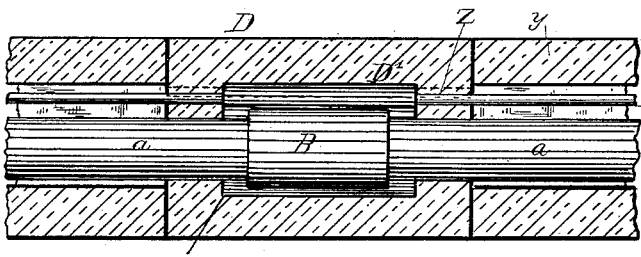
Figure 4:
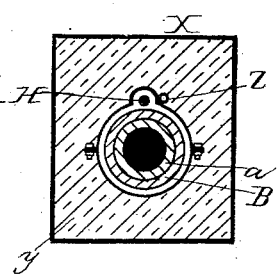

Figure 1 represents a longitudinal section of a joint constructed according to my invention. Fig. 2 represents a cross-section of the same. Fig. 3 is a longitudinal section of the main line with a joint thereon, as constructed according to my invention, for the preservation of the pipes. Fig. 4 is a cross-section of the same.

In the system of conduits invented by me there are two lines of pipe—one the main line for the conveyance and transportation of gas under pressure, and the other an escape-line constructed of pipe of smaller diameter, and having vents into the open air through pipes connected with it at intervals along its length. The joints on the main line are incased in casings or boxes, which may be made of wood or metal or other suitable material, and of such size that one may be placed within the other, the space between them being filled with pitch or cement or suitable material. The mains of the system extend continuously through both casings or boxes surrounding the joint, the casings or boxes being tightly fitted around the main. The escape-line is not a continuous one, but is cut at the cases surrounding each joint and ends in the receptacle of the inner case. This construction is shown in Fig. 1. In this figure, *a a* represent the lengths of pipe of the main line; B, the ordinary socket-joint connecting them; D′ D, the inner and outer cases or boxes, respectively, which may be of the shape here shown or any shape so that they fit the main line tightly, and provide chamber $D^2$ for the escaping gas and means of connection for the escape-line of pipe. The space between the boxes D D′ is filled with pitch or cement or other suitable substance.

H H represent the escape-line, whose pipes extend through both cases or boxes and end in the interior chamber, $D^2$, of the inner case or box, D′. The joints of the escape-pipes H H with the cases or boxes D′ D are made as tight as possible. The escape-pipes H H follow the main line and extend continuously with it with the construction of the joints on the main line as above described.

The hole and stopper (represented at I) are used, in case the cases or boxes are made of metal, for the purpose of filling the space C with pitch, cement, or other suitable material of a similar nature. This construction protects the joints on the main line from corrosion from any cause whatever, and conducts any gas leaking at the joint B into the open air in the manner following: Any gas collecting in the interior chamber, $D^2$, of the box or case D′ will flow through the escape-pipes H H and through their open-air connections into the open air.

Fig. 2 is a cross-section of Fig. 1 and shows the same construction, I being the hole and stopper, and D′ D the inner and outer cases or boxes, respectively. C is the space between them; $D^2$, the chamber within the box D′; H, the connecting-point of the escape-pipe H; *a a*, the pipe of the main line, and B the sleeve of the joint B, all the references referring to Fig. 1.

Fig. 3 represents a longitudinal section of my system of conduits as applied to the preservation and protection of the main and escape lines, as well as the joints of the main line. In this figure, X′ X represent a case or box inclosing the main and escape lines, and extending from and between the cases or boxes inclosing and protecting the joints on the main line, and are of similar construction. The cross-section of these cases or boxes may be square or circular or of any shape, so that they inclose the pipes, and may be made of wood, metal, or other suitable material, whether fibrous or granular or composition. The space $y\,y$ between the cases or boxes X' X is filled with pitch, cement, or other suitable material. The recesses in the cases or boxes in which the main and escape lines are placed are connected with one another by the pipe Z, for the purpose of equalizing the pressure in all the recesses should any leak or fault occur in the pipes themselves. If the gas should escape into these recesses, it is conducted away by means of pipes connected with the recesses at intervals along the line extending into the open air. This construction will protect the pipes from corrosion by moisture or other causes.

Fig. 4 is a cross-section of Fig. 3, and like parts are indicated in the figures by like letters.

What I claim, and desire to secure by Letters Patent, is—

1. In a system of conduits for the conveyance and transportation of gas under pressure, a joint-case consisting of two boxes placed one within the other, the recess or space between them being filled with pitch or cement or other suitable substance of a similar nature, having apertures for passage of the main line of pipes, and a receptacle in the inner case with connections for an escape-line, which has connection leading to the open air, substantially as described.

2. In a system of conduits for the conveyance and transportation of gas under pressure, a pipe-case consisting of an inner and outer case, with a space between the same filled with pitch or cement or other suitable substance, and an interior chamber with connections between the sections of the pipe-case and connections with the open air, substantially as described.

In testimony that I claim the foregoing as my own I have heretofore affixed my signature in presence of two witnesses.

HARVEY BARTLEY.

Witnesses:
A. A. MOORE,
JNO. F. ATCHESON.